United States Patent
Doan et al.

(10) Patent No.: US 7,535,361 B2
(45) Date of Patent: May 19, 2009

(54) METHOD AND SYSTEM FOR AGGREGATION OF RFID SIGNAL SOURCES AND COMPOSITE TO DEVELOP A UNIQUE SIGNATURE

(75) Inventors: Christopher Hoang Doan, Austin, TX (US); Liliana Orozco, Del Valle, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/945,483

(22) Filed: Nov. 27, 2007

(65) Prior Publication Data

US 2008/0068153 A1    Mar. 20, 2008

Related U.S. Application Data

(62) Division of application No. 11/157,449, filed on Jun. 21, 2005, now Pat. No. 7,323,992.

(51) Int. Cl.
*G08B 13/14* (2006.01)
(52) U.S. Cl. ............... 340/572.4; 340/10.42; 340/573.1
(58) Field of Classification Search ............... 340/572.1, 340/572.4, 573.1, 539.11, 539.13, 10.1, 10.4, 340/10.41, 10.42
See application file for complete search history.

(56) References Cited

U.S. PATENT DOCUMENTS

| | | |
|---|---|---|
| 5,604,486 A | 2/1997 | Lauro et al. |
| 2005/0035852 A1 | 2/2005 | Paulsen |
| 2005/0093698 A1* | 5/2005 | Sakamoto et al. ........ 340/572.1 |
| 2005/0099292 A1 | 5/2005 | Sajkowsky |
| 2005/0177466 A1 | 8/2005 | Willins |
| 2006/0017545 A1 | 1/2006 | Volpi et al. |

\* cited by examiner

*Primary Examiner*—Thomas J Mullen
(74) *Attorney, Agent, or Firm*—Duke W. Yee; Jeffrey S. LaBaw; Gerald H. Glanzman

(57) ABSTRACT

A method is presented for employing radio frequency (RF) identifier (ID) transponder tags (RFID tags) to create a unique identifier, termed an RFID signature, for use within a data processing system with respect to a person or an object. An interrogation signal is transmitted toward a person or an object with which a set of one or more RFID tags are physically associated. A first set of RFID tag identifiers are obtained from an interrogation response signal or signals returned from the set of one or more RFID tags. A mathematical operation is performed on the first set of RFID tag identifiers to generate an RFID signature value, which is employed as an identifier for the person or the object within the data processing system with respect to a transaction that is performed by the data processing system on behalf of the person or the object.

20 Claims, 4 Drawing Sheets

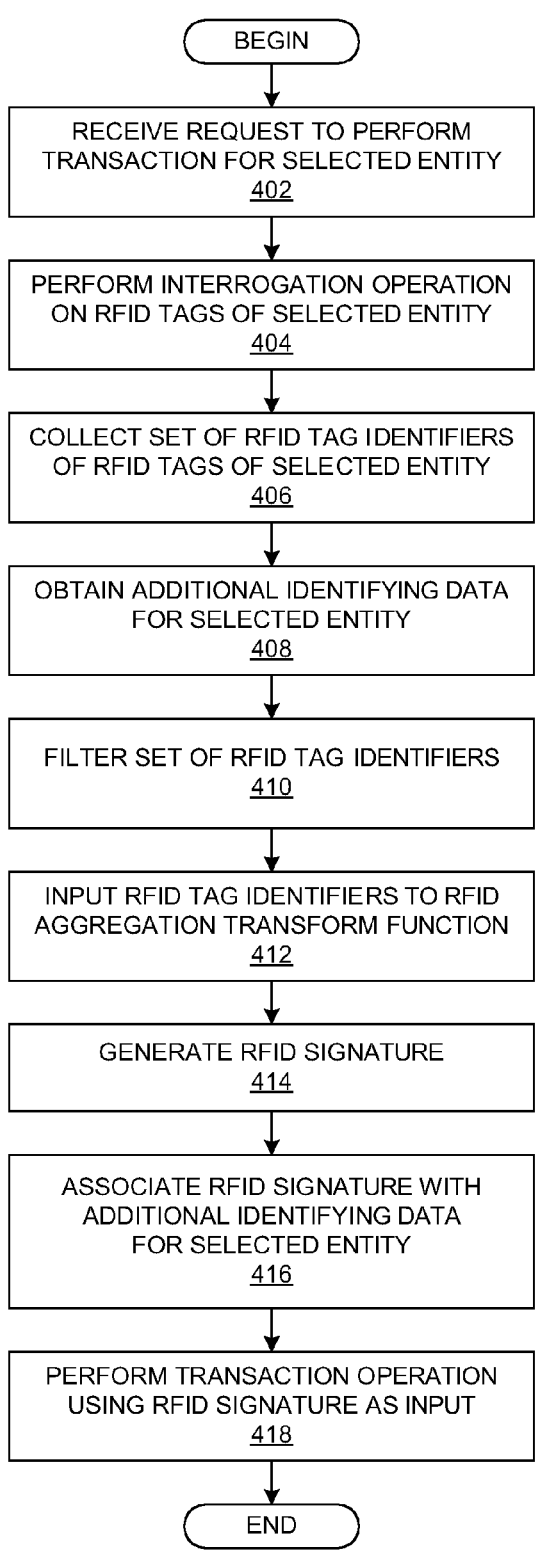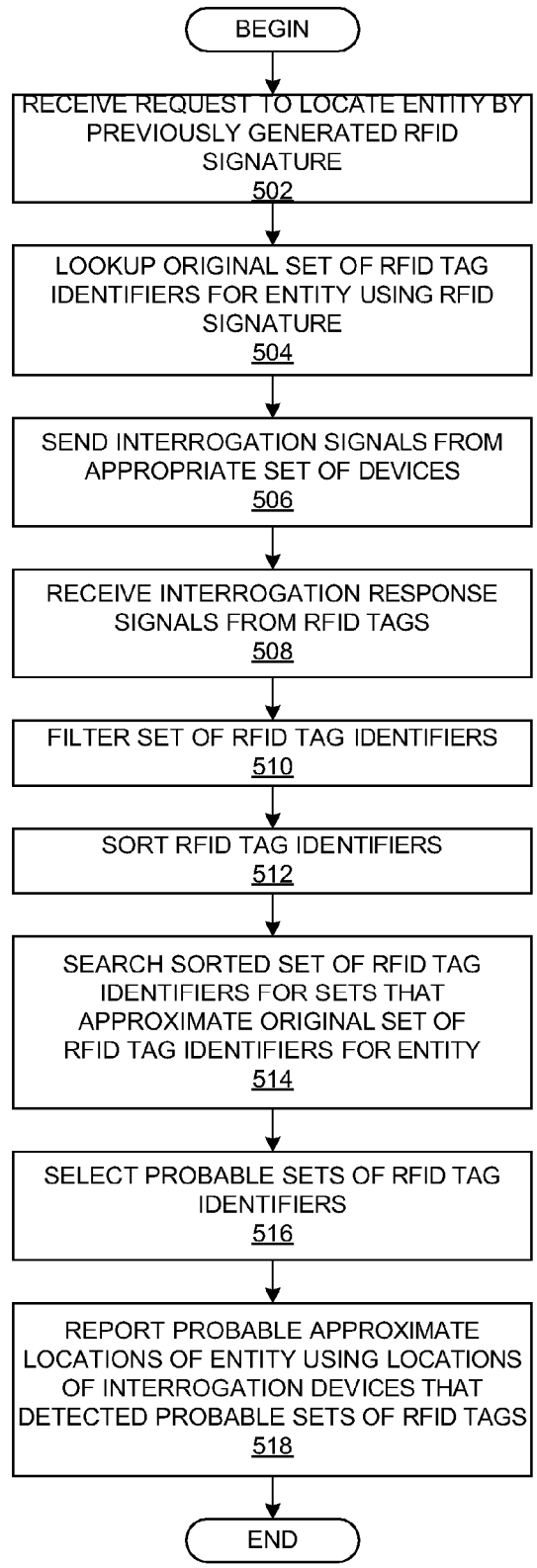
FIG. 4
FIG. 5

METHOD AND SYSTEM FOR AGGREGATION OF RFID SIGNAL SOURCES AND COMPOSITE TO DEVELOP A UNIQUE SIGNATURE

This application is a divisional of application Ser. No. 11/157,449, filed Jun. 21, 2005, now U.S. Pat. No. 7,323,992.

BACKGROUND OF THE INVENTION

1. Field of the Invention

The present invention relates to an improved data processing system and, in particular, to a method and apparatus for employing wireless electrical communication for selectively locating and/or selectively identifying entities.

2. Description of Related Art

There are many ways in which identification of people and objects can be accomplished. People have physical characteristics, such as fingerprints or distinguishing facial characteristics, that can be used for identification. Other types of biometric data, such as data from retinal scans, may also be used. For example, an airport might use a facial recognition system as part of its security screening. Information for human identification is often augmented by artificial means, such as ID badges or smart cards, on which identification information is placed.

Inanimate objects can also be identified by inherent physical features, but man-made objects are often identified using an assigned identification number, such as a serial number. An identification number is applied to a man-made object in a human-readable or a machine-readable manner, which allows the man-made object to be identified by humans or machines, as appropriate. In many cases, though, a corporation or an organization is not interested in identifying the man-made object on which the identification number is placed but yet a different man-made object to which the object with the identification number is attached. In this manner, an object with an identification number is typically used as a label to be affixed to another object. For example, governmental organizations are not interested in identifying license plates via license plate numbers; the automobiles to which the license plates are attached are the specific objects that are meant to be identified. A license plate can be regarded as a type of label or tag, similar to a label or tag that is affixed to a package or to a product.

There are many scenarios in which a corporation or an organization may desire to identify a person, an animal, or an inanimate object. In some cases, an entity is tagged for a specific identification purpose, e.g., when a person is tagged by means of an ID badge that is valid or meaningful only for a given corporation. Even so, significant effort may be exerted in obtaining, managing, and protecting identification information to ensure that it is not abused. In other cases, an entity might be permanently tagged in a manner that is useful for many different parties, such as bar codes on product labels, and this identification information is freely available and generally recognizable.

There are some scenarios, though, in which a corporation or an organization may desire to have a temporary ability for identifying or locating a person or an inanimate object, and it would not be appropriate to employ the mechanisms that are noted above or other well-known mechanisms. For example, in some cases, it would not be cost-effective to expend significant effort beforehand to register someone or something in order to provide a unique identification number. In other cases, it might not be appropriate to affix an identification label for a temporary purpose.

Therefore, it would be advantageous to implement methods and associated devices that enable short-term identification and location of persons and things without significant registration procedures beforehand and without requirements to access proprietary databases to obtain identifying information. It would be particularly advantageous to enable short-term identification and location of persons and things while employing labels or tags that have already been affixed to objects for other purposes.

SUMMARY OF THE INVENTION

A method, system, apparatus, and computer program product is presented for employing radio frequency (RF) identifier (ID) transponder tags (RFID tags) to create a unique identifier, termed an RFID signature, for use within a data processing system with respect to a person or an inanimate object, primarily for temporary purposes. When an RFID signature is desired for a person or an object, an interrogation signal or signals is transmitted toward a person or an object with which a set of one or more RFID tags are physically associated. A first set of one or more RFID tag identifiers are obtained from an interrogation response signal or signals returned from the set of one or more RFID tags. A mathematical operation is performed on the first set of one or more RFID tag identifiers to generate an RFID signature value, which is employed as an identifier for the person or the object within the data processing system with respect to a transaction that is performed by the data processing system on behalf of the person or the object.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 4 depicts a flowchart that shows a process for generating an RFID signature with respect to a transaction for a given entity in accordance with an embodiment of the present invention;

FIG. 5 depicts a flowchart that shows a process for employing an RFID signature to locate a given entity in accordance with an embodiment of the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
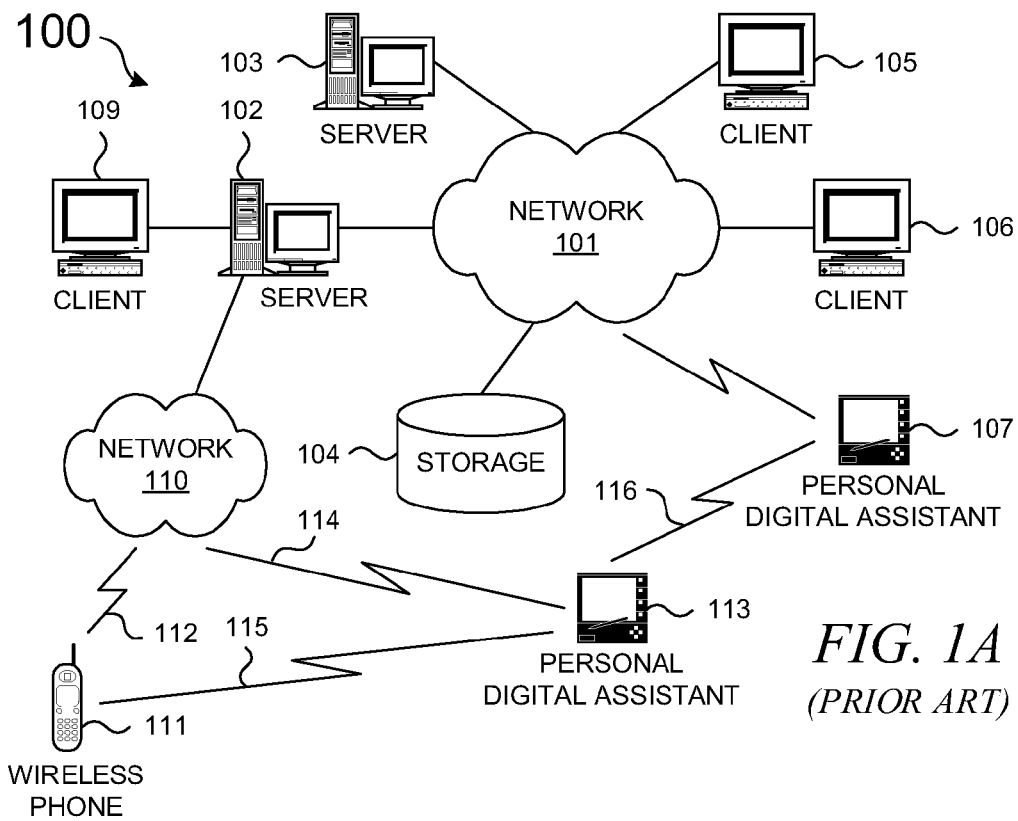
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
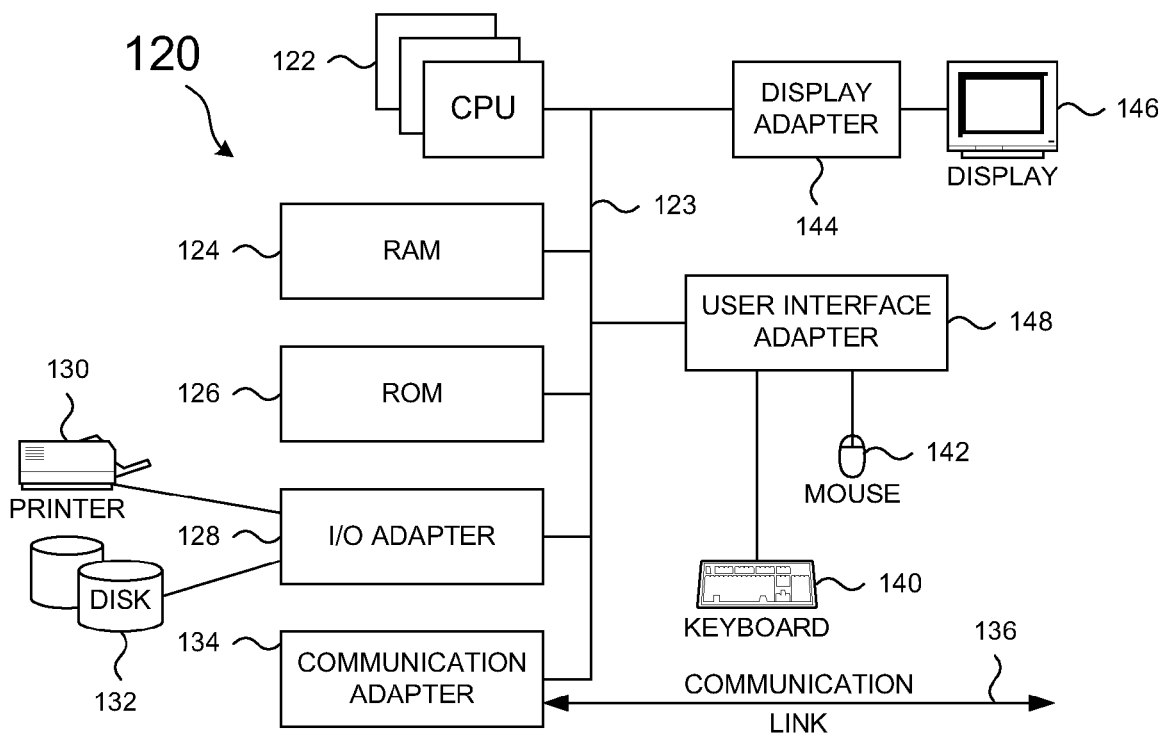
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to a computer system as described in more detail below with respect to the remaining figures.

As noted above, there are some scenarios in which a corporation or an organization may desire to have a temporary ability for identifying or locating a person or an inanimate object, yet it would not be appropriate to employ well-known mechanisms. In some cases, it might not be appropriate to affix an identification label to someone or something for a temporary purpose. In other cases, it would not be cost-effective to expend significant effort beforehand to register someone or something in order to provide a unique identification number. For example, a formal registration process can be time-consuming and, therefore, relatively expensive for the purpose that is to be achieved. Moreover, for many purposes, persons may object to a registration process as an invasion of privacy because of the personal data that would need to be gathered during a registration process.

The present invention provides a solution that enables short-term identification of persons and/or things without significant registration procedures and without requirements to access proprietary databases to obtain identifying information. More advantageously, the present invention accomplishes the short-term identification of persons and/or things without requiring the temporary affixation of labels or tags to persons or things specifically for the short-term identification purpose. In addition, the present invention provides the ability in many cases to accomplish a location operation within certain bounds during a short-term time period in which the short-term identification purpose is active.

The present invention accomplishes these goals by leveraging identification information that has already been affixed or juxtaposed to persons or objects for other purposes. More specifically, the present invention leverages the presence of a set of ubiquitous RFID tags that have already been affixed or juxtaposed to persons or objects; a set of RFID tags are physically associated with, i.e. physically connected to or physically touching, a person or an object such that when the person or the object is translated, re-oriented, or otherwise moved, the set of RFID tags are also moved with the person or the object so that the RFID tags remain collocated with the person or the object.

The use of radio frequency (RF) identifier (ID) transponders, also known as RFID tags, has grown in prominence as a way to compile data regarding an object to which the RFID transponder is affixed. RFID transponders have been used in a variety of automatic data identification applications. An object can be tracked in terms of location of the object, e.g., indication at a particular place at a particular time or a series of locations over a period of time, or in terms of identification of the object, e.g., indication of the object as distinguished from other similar objects in proximity to the object.

RFID transponders can be manufactured with a variety of characteristics and capabilities. A type of RFID transponder that is termed a "passive RFID tag" can extract its power from the electromagnetic field or signal that is provided by an interrogator device. Under a technique referred to as backscatter modulation, the RFID transponders transmit stored data by reflecting varying amounts of an electromagnetic field provided by an RFID interrogator by modulating their antenna matching impedances. A type of RFID transponder that is termed an "active RFID tag" may include its own power source, such as a small battery. An RFID transponder may be accompanied by a semiconductor memory in which digital information may be stored or other electronic circuitry for more advanced data processing characteristics.

RFID transponders can be manufactured in very small, lightweight, and inexpensive units. RFID transponders that extract their power from the interrogating signal are particularly cost-effective since they lack a power source that would add to cost and weight. In view of these advantages, usage of RFID tags is expected to become ubiquitous. For example, the ability to place RFID tags in product labels has led to usage of the term "smart labels", which are expected to be placed on all retail items.

RFID transponders can be used in many types of applications, such as retail transactions or applications in which it is desirable to track information with respect to a moving or inaccessible object. One such application is to affix RFID transponders to packages or parcels, thereby replacing the functionality of a typical bar code. An RFID reader, i.e. an RFID interrogator device, that is located adjacent to the conveyor belt can recover information from the RFID transponder of each tagged object that passes the interrogator device no matter what the orientation of the package on the conveyor belt. The RFID interrogator may then communicate the collected information to a computer or computer network for further processing by a software application. Through these types of applications, RFID technology may be used to identify objects automatically and without manual handling operations as is required in most bar code systems.

While many different applications and supporting technologies for RFID tags exist in the prior art, a common characteristic among each of these applications is that a reader or interrogator identifies an RFID tag. In other words, some type of identifier is obtained from an RFID tag, which is then communicated to a data processing system for some useful purpose. The present invention recognizes that pre-existing RFID tags can be used for certain short-term identification and/or location purposes, as explained in more detail hereinbelow with respect to the remaining figures.

Figure 2:
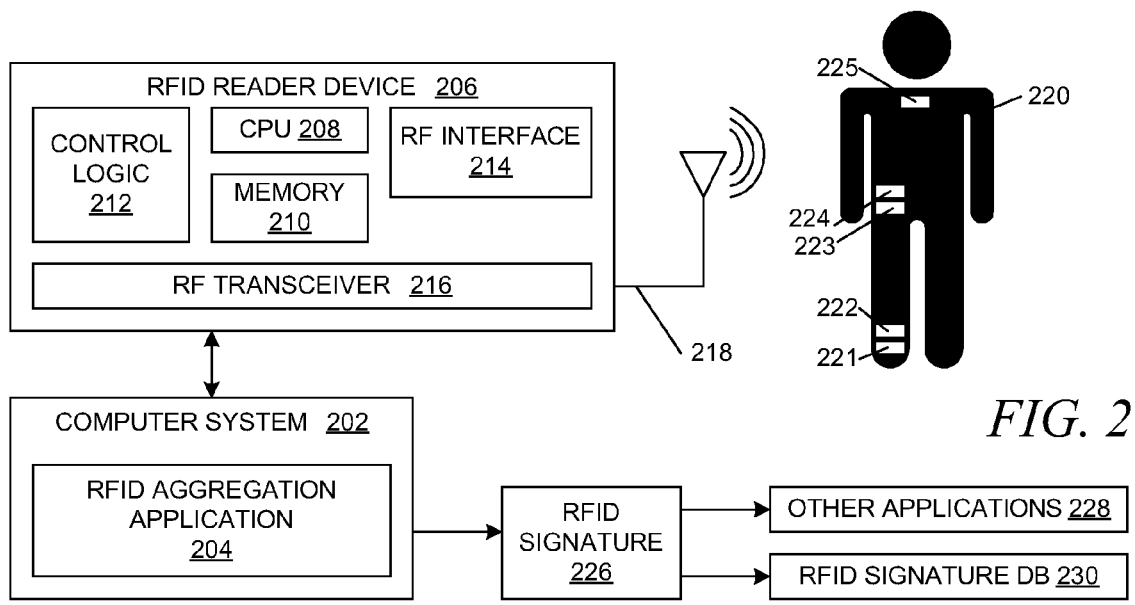
FIG. 2 depicts a block diagram that shows some elements of a data processing system that may be used to capture an aggregation of RFID identifiers and then generate an RFID signature in accordance with an embodiment of the present invention.

With reference now to FIG. 2, a block diagram depicts some elements of a data processing system that may be used to capture an aggregation of RFID identifiers and then generate an RFID signature in accordance with an embodiment of the present invention. Computer system 202 is a data processing system, which may represent a stand-alone computer, such as server 102 in FIG. 1A, or a networked system, such as system 100 in FIG. 1A. RFID aggregation application 204 executes within computer system 202 to control RFID reader or interrogator device 206 to generate RFID signatures; the generation of RFID signatures is explained in more detail further below.

RFID reader device 206 includes CPU 208 for executing software and/or firmware, which may be stored within memory 210. Control logic 212 may include signal processing functionality or other electronic circuitry. RF interface 214 provides an interface between software functionality and hardware functionality for accepting commands to transmit/received signals to/from RFID tags and for reporting information that is captured from RFID tags for subsequent use by other components within the data processing system. RFID interface 214 controls RF transceiver 216, which transmits and receives RF signals via antenna 218 to RFID tags.

FIG. 2 shows a typical person as being physically associated with multiple RFID tags in a typical fashion. Person 220 may be assumed to be wearing various items of clothing that are not explicitly illustrated in the figure. Several items of clothing have an associated RFID tag affixed to them in some manner such that person 220 carries multiple RFID tags 221-225 as person 220 wears the items of clothing. For example, an RFID tag may be sewed or glued to a cloth label that is sewed or glued to an item of clothing. As person 220 wears an RFID-tagged item of clothing, the RFID tag remains in close proximity to person 220, thereby physically associating an RFID tag with person 220. It should be noted that the present invention may also be used with inanimate objects or things, as illustrated in other figures hereinbelow. In the example that is shown in FIG. 2, person 220 wears items of clothing to which are affixed RFID tags 221-225: RFID tag 221 may be affixed to a shoe; RFID tag 222 may be affixed to a sock; RFID tag 223 may be affixed to a pair of pants; RFID tag 224 may be affixed to a belt; and RFID tag 225 may be affixed to a shirt.

When person 220 is in close proximity to RFID reader device 206, RFID reader device 206 is manually or automatically triggered to transmit interrogation signals; the distance within which person 220 is required to be may vary depending on the technology that is used by RFID reader device 206. As RFID tags 221-225 receive an interrogation signal or signals from RFID reader device 206, each of RFID tags 221-225 generate a response signal, and the response signals are detected by RFID reader device 206. Each of the response signals carries data that includes an RFID tag identifier that is encoded within the response signal in an appropriate manner. An RFID tag identifier is a data value that identifies an RFID tag and distinguishes it from other RFID tags to some degree. An RFID tag identifier may be a GUID identifier (globally unique identifier), an identifier within a product classification, such as a UPC identifier (Universal Product Code), a serial number of some kind, or some other type of identifier. In the example in FIG. 2, it is possible that person 220 may be physically associated with two or more RFID tags that respond with identical RFID tag identifiers, e.g., by wearing two socks which each have an identical RFID tag.

The set of RFID tag identifiers that are determined by RFID reader device 206 are collected to represent a set of aggregated RFID tag identifiers, which are processed by RFID aggregation application 204. As explained in more detail hereinbelow, RFID aggregation application 204 generates RFID signature 226, either under the control of a user or system administrator or under the control of functionality that automatically or programmatically performs the operation. RFID signature 226 may be reported to other applications 228 for subsequent use or stored within a general purpose database or a special purpose database, such as RFID signature database 230, from which RFID signature 226 may be retrieved at some later point in time.

Figure 3:
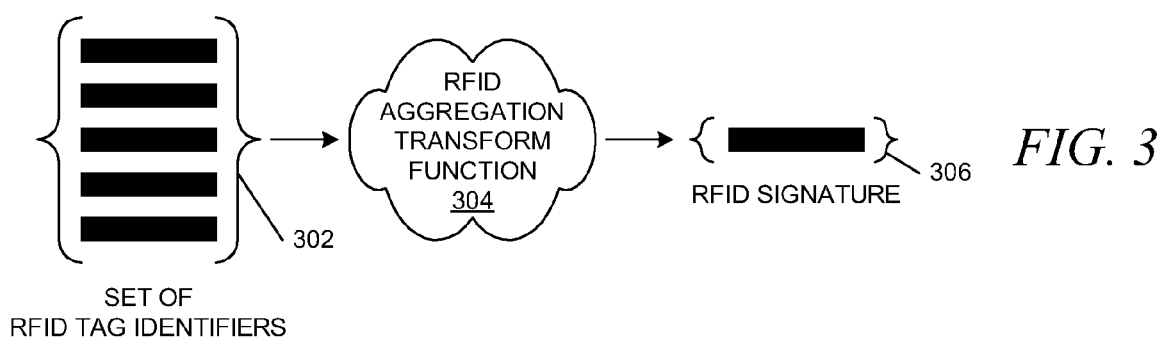
FIG. 3 depicts a diagram that shows an RFID aggregation transform function that is employed by the present invention.

With reference now to FIG. 3, a diagram illustrates an RFID aggregation transform function that is employed by the present invention. After a set of RFID tag identifiers has been accumulated with respect to a given person or a given object, the set of RFID tag identifiers may be represented by a record or data structure 302 that stores the set of one or more RFID tag identifiers within some type of memory device. At some point in time, data structure 302 that contains the set of RFID tag identifiers is retrieved by RFID aggregation transform function 304, which represents functionality within software, firmware, or hardware for implementing the process of generating RFID signature 306. RFID aggregation transform function 304 accepts the set of one or more RFID tag identifiers as a set of input parameters, and RFID aggregation transform function 304 returns RFID signature 306 as an output parameter, which may be stored within a physical memory or transmitted via a physical transmission medium.

An implementation of the present invention may support RFID signatures in a variety of data formats. Hence, RFID aggregation transform function 304 may generate RFID signature 306 in a variety of manners, and RFID aggregation transform function 304 may represent a variety of implementations of storable software/firmware and/or hardware logic.

In one embodiment of the present invention, RFID signature 306 may be generated by sorting the set of one or more RFID tag identifiers and then appending the one or more RFID tag identifiers to each other to create a sorted series of RFID tag identifiers. At this point, the RFID signature 306 may be represented by a string of binary digits or bits. The sorted series of RFID tag identifiers may be compressed in any appropriate manner, e.g., by generating a hexadecimal digit character string that represents the string of bits, and hence, the value of RFID signature 306.

In a different embodiment of the present invention, RFID signature 306 may be generated by sorting the set of one or more RFID tag identifiers and then inputting the sorted series of RFID tag identifiers into a hashing function; the outputted hash value is used as RFID signature 306. Again, the hash value may be compressed in any appropriate manner, e.g., by generating a hexadecimal digit character string that represents the hash value. Other implementations of the present invention may employ other mathematical or logical functions for generating an RFID signature either in place of or in addition to those noted above.

In a preferred embodiment, RFID aggregation transform function 304 is a function that provides a unique one-to-one mapping of an input values or values to an output value. Hence, RFID signature 306 is a single data value that acts as an aggregate identifier to uniquely represent the set of one or more RFID tags that originated the RFID tag identifiers within data structure 302. In other words, RFID signature 306 is a single data value that acts as an aggregate identifier for the originating RFID tags as a whole. Since the set of originating RFID tags may be regarded as uniquely representing a person or an object with which they are physically associated, RFID signature 306 may be regarded as uniquely representing the person or the object that is physically associated with the originating RFID tags.

It should be noted, however, that not all of the RFID identifiers that are obtained from an originating set of RFID tags are necessarily required to be used within RFID aggregation transform function 304; some RFID tag identifiers may be discarded before generating RFID signature 306. For example, redundant RFID identifiers might be discarded, such as discarding one of two identical RFID identifiers from two identical RFID tags, e.g., which might be affixed to a pair of socks. In other cases, entire classes of RFID tags might be discarded, e.g., to address privacy concerns. A discard policy for a set of one or more RFID tag identifiers may be obtained with reference to a database of RFID tag identifiers for this purpose. Alternatively, a discard policy may merely indicate a type of RFID tags to be ignored or a class of products to be ignored, such as clothing. Using a lookup operation within a non-proprietary database, such as a database of UPC codes and their associated classification of products, the class of product for a correlated RFID tag could be determined, after which a decision is made whether or not to include its RFID identifier in accordance with the discard policy to generate the resulting RFID signature. By stepping through the set of RFID tag identifiers, a discard determination is made with respect to each RFID tag identifier, thereby filtering the entire set of RFID tag identifiers.

With reference now to FIG. 4, a flowchart depicts a process for generating an RFID signature with respect to a transaction for a given entity in accordance with an embodiment of the present invention. The process commences when a data processing system receives a request to perform a transaction with respect to a given or selected entity (step 402). An interrogation operation is performed on the RFID tags that are physically associated with the selected entity using an RFID reader or interrogator device (step 404). For example, the entity might be electromagnetically isolated from other entities to prevent contamination of the interrogation operation in which RFID tags from other entities respond to the interrogation signals. The set of RFID tag identifiers that are returned by the RFID tags of the selected entity are then collected (step 406). If necessary, additional identification or identity information about the selected entity may also be obtained (step 408), e.g., a digital photograph of the selected entity, biometric data for a natural person, dimensional data that is obtained by scanning the entity, or some other type of data. If the entity was paused in its movement for the interrogation operation, e.g., by halting a walking person within a security checkpoint or a building entrance or by stopping a conveyance of an inanimate object, the entity may then be released to continue its movement.

The obtained set of RFID tag identifiers may then be filtered if necessary (step 410), e.g., in a manner similar to that described above with respect to FIG. 3. The set of RFID tag identifiers are then input into an RFID aggregation transform function (step 412), and an RFID signature value is generated (step 414). The RFID signature may then be associated with additional identifying data for the entity if necessary (step 416), e.g., additional identification data that was obtained at step 408. If appropriate for the current transaction or for expected subsequent transactions, the original set of RFID tag identifiers may also be stored in association with the RFID signature and any other appropriate identification data.

At some point, the originally requested transaction is performed using the RFID signature as one of possibly many input parameters (step 418), and the process is concluded. For example, a sales transaction with respect to the entity may be performed, wherein the RFID signature is used as an identifier for the entity for uniquely associating the sales transaction with the entity. In other scenarios, the RFID signature is stored for subsequent use, or the RFID signature is provided to another module or application for its use. Further examples of the usage of an RFID signature are provided hereinbelow.

With reference now to FIG. 5, a flowchart depicts a process for employing an RFID signature to locate a given entity in accordance with an embodiment of the present invention. The process commences when a data processing system receives a request to locate an entity using an RFID signature as an identifier for the given entity (step 502). The RFID signature may have been previously generated and previously associated with the entity using an interrogation and RFID aggregation procedure that is similar to the one that is shown in FIG. 4. The RFID signature value is employed as a key value to lookup the original set of RFID tag identifiers that were used to generate the received RFID signature (step 504), and the original set of RFID tag identifiers are temporarily stored for subsequent use later in the process.

The RFID subsystem/system is then directed, either automatically or under the control of a system administrator, to send an interrogation signal or signals from an appropriate set of RFID interrogation/reader devices within a given area (step 506). The location operation of the present process may occur within one or more areas as appropriate, depending on the coverage of one or more areas by the interrogation signals or by the placement of interrogation devices within those areas. For example, to locate a given entity within a building, it may be appropriate to activate devices within an entire building; to locate a given entity on a given area of a building, it may be appropriate to activate devices only on one floor or within certain sections of a subset of adjacent floors. It should be noted that the granularity of distance with which the current process may locate a given entity may be dependent upon many factors: the RFID technology that is employed; the size of a given area; the potential signal interference within a given area; the number of RFID reader devices within a given area; the granularity of placement of those RFID reader devices within the given area; and/or other possible factors.

The RFID reader devices receive interrogation response signals from the RFID tags (step 508), and the RFID tag identifiers within those response signals may then be filtered if necessary (step 510), e.g., as described with respect to FIG. 3. The RFID tag identifiers are sorted if necessary to assist in the following search process (step 512). The sort operation might be performed with respect to many factors: the location of an RFID tag's interrogation response signal in relation to nearby RFID reader devices, i.e. the detection of a strong signal by an RFID reader device may imply less distance from a responding RFID tag; likely groupings of RFID tags by classification of product, e.g., certain RFID tags for clothing are more likely to be located on a single person; and/or other sort criteria.

The sorted set of RFID tag identifiers are then searched for sets or subsets of RFID tag identifiers that match or approximate the original set of RFID tag identifiers for the entity that was retrieved earlier in the process (step 514). For example, the present invention assumes that a physically associated set of RFID tags, such as a set of RFID tags on items of clothing for a single person, may not necessarily be related in any manner, e.g., by having a common manufacturer, a common retail origin, or any other common characteristics that might be looked up with reference to a database, such as a database of UPC codes. Hence, it is possible that a potentially large number of RFID tag identifiers are collected during the RFID interrogation operation, yet the present invention is only able to rely on spatial information with respect to the RFID reader devices and on patterns or subgroups of RFID tag identifiers that have been discovered. Thereafter, the collected (and possibly sorted) set of RFID tag identifiers needs to be processed by performing pattern matching operations or by performing dimensional analysis on groups and subgroups of the collected set of RFID tag identifiers.

Using this analysis, probable sets of RFID tag identifiers are then selected (step 516). Probable approximate locations of the given entity are then reported or returned in a response to the requesting component of the system (step 518), and the process is concluded.

The accuracy of the reported location or locations may be high in some cases. However, the reported locations may be relative to the RFID reader devices that are assumed to have assisted in identifying the location of the given entity, and the relative locations may be approximate because of the limiting factors that were mentioned above. Hence, in some scenarios, the accuracy of the reported location or locations may be low.

Moreover, a given entity may be identified correctly and exactly using the present invention. However, the present invention provides support for fuzzy logic in its determinations. The probability of locating a given entity may be high in some cases, but in other cases, it is possible that the analysis may produce estimates of multiple locations for the given entity with low probabilities. For example, within a given enclosed area, it is possible that there may be more than one person or object on which a similar set of RFID tags are affixed or are physically associated. Depending on the manner in which an RFID tag is generated, e.g., whether or not the RFID tag identifiers are filtered, etc., different persons or objects might present similar sets of RFID tag identifiers when interrogated. In addition, the interrogation response signals might be muffled by interference for many reasons, thereby narrowing the detected set of RFID tag identifiers from which to uniquely identify each entity. Hence, it is possible that an appropriate result of the location process is the determination of multiple possible locations.

Figure 6:
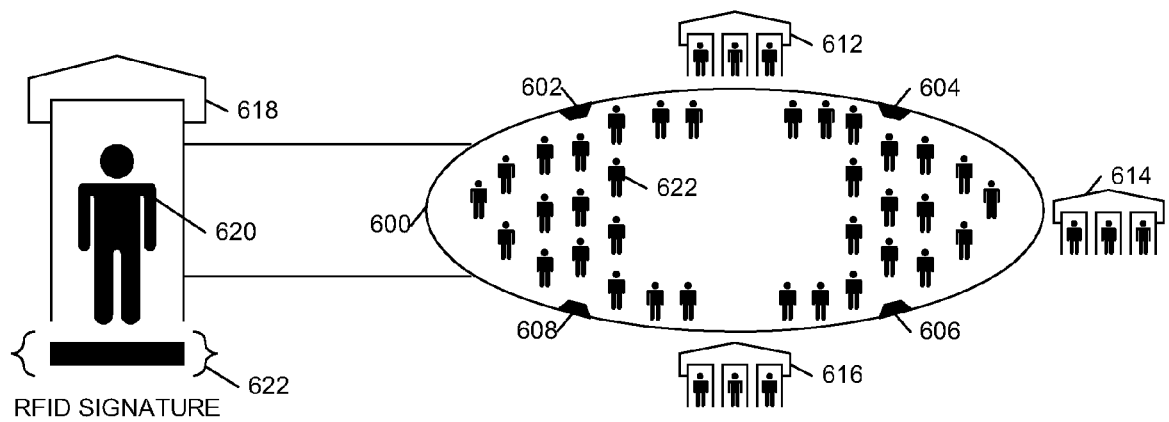
FIG. 6 depicts a diagram that shows a stadium in which an embodiment of the present invention may be employed to identify and locate persons within the stadium or to perform various financial transactions with respect to persons within the stadium.

With reference now to FIG. 6, a diagram depicts a stadium in which an embodiment of the present invention may be employed to identify and locate persons within the stadium or to perform various financial transactions with respect to persons within the stadium. Many persons are spectators to an athletic event that is being held within stadium 600, which contains multiple RFID interrogation devices 602-608 throughout the stadium. Each of entrances 612-618 comprises one or more RFID interrogation stations, which act to isolate each entering spectator so that an accurate interrogation can be made of the RFID tags that are located on a spectator's items of clothing. As person 620 passes through interrogation station 618, an RFID interrogation operation is performed in accordance with the present invention, e.g., in a manner similar to that described above with respect to FIG. 2 or FIG. 4, to produce RFID signature 622 that becomes associated with person 620.

RFID signature 622 can be used as a temporary identifier for person 620 while person 620 is within stadium 600. If person 620 is desired to be located during the event within stadium 600, RFID interrogation devices 602-608 may be employed to locate person 620 in a manner similar to that described above with respect to FIG. 5. For example, a facial recognition function within a security application may process digital photographs that were captured as persons passed through the RFID interrogation stations of the stadium. If the security application indicates that an individual in one of the digital photos is wanted by law enforcement agencies, the present invention provides the functionality for locating the individual within the stadium.

When person 620 initiates certain transactions, RFID signature 622 may be used to identify person 620 with respect to those transactions. For example, RFID signature 622 can be used to positively identify person 620, thereby enabling event personnel to allow a person to exit and re-enter the stadium. Additional RFID interrogation stations may be located within the stadium for special purpose transactions. For example, when person 620 wants to reserve a spot in a special interior event or interior ticket line or wants to reserve a table at a restaurant in a sky box within the stadium, person 620 may be scanned by an RFID interrogation station, thereby producing RFID signature 622 that can be used to identify person 620. At some later point in time, person 620 may reappear, and person 620 is rescanned. By matching the previously generated RFID signature with the currently generated RFID signature, the appropriate system component can indicate that it has successfully verified that person 620 is the same person that originally initiated a reservation transaction, thereby allowing event personnel to complete the transaction that is associated with the reservation.

Figure 7:
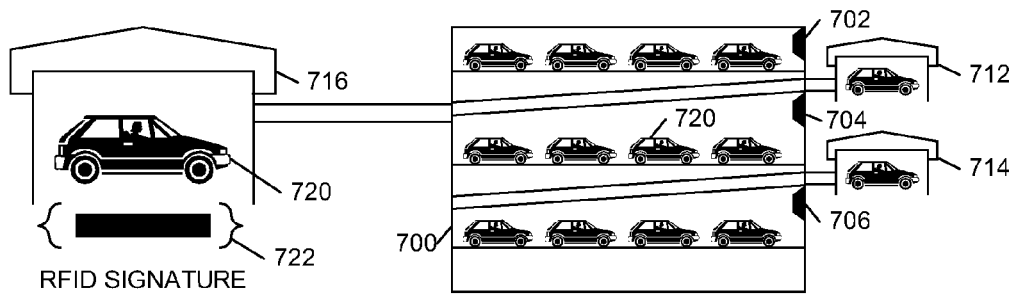
FIG. 7 depicts a diagram that shows a commercial parking garage in which an embodiment of the present invention may be employed to identify and locate vehicles within the parking garage or to perform various financial transactions with respect to vehicles within the parking garage.

With reference now to FIG. 7, a diagram depicts a commercial parking garage in which an embodiment of the present invention may be employed to identify and locate vehicles within the parking garage or to perform various financial transactions with respect to vehicles within the parking garage. Many vehicles can be parked within parking garage 700, which contains multiple RFID interrogation devices 702-706 throughout the parking garage. Each of parking garage entrances 712-716 comprises one or more RFID interrogation stations, which act to isolate each entering or exiting vehicle so that an accurate interrogation can be made of the RFID tags that are located on parts of the vehicle. As vehicle 720 passes through interrogation station 716, an RFID interrogation operation is performed in accordance with the present invention, e.g., in a manner similar to that described above with respect to FIG. 2 or FIG. 4, to produce RFID signature 722 that becomes associated with vehicle 720. It may be assumed that a filter operation ignored RFID tags that are not associated with auto parts, e.g., such as RFID tags that are easily removed or RFID tags that are affixed to items of clothing that are worn by vehicle operators.

RFID signature 722 can be used as a temporary identifier for vehicle 720 while vehicle 720 is within parking garage 700. If vehicle 720 is desired to be located within parking garage 700, RFID interrogation devices 702-706 may be employed to locate vehicle 720 in a manner similar to that described above with respect to FIG. 5.

When the operator of vehicle 720 initiates certain transactions, RFID signature 722 may be used to identify vehicle 720 with respect to those transactions, e.g., such as allowing vehicle 720 to exit and re-enter the parking garage in accordance with a previously purchased parking contract or to park in certain locations with respect to a previously purchased parking contract.

Figure 8:
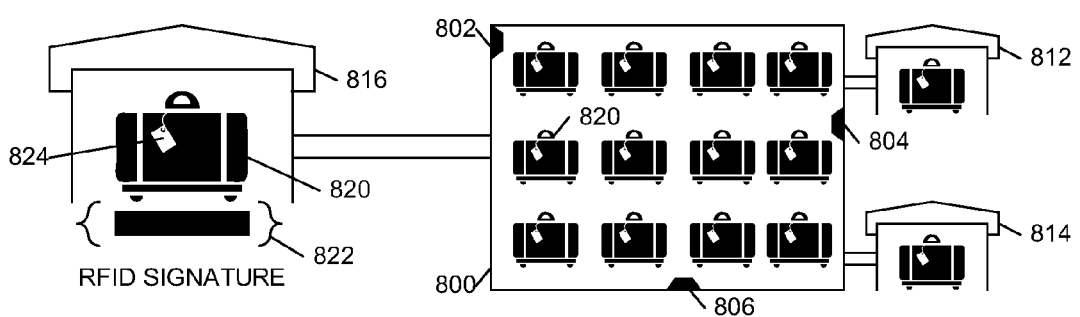
FIG. 8 depicts a diagram that shows an airline luggage storage/processing facility in which an embodiment of the present invention may be employed to identify and locate suitcases or other types of luggage within the luggage storage/processing facility or to perform other types of transactions with respect to pieces of luggage within the luggage storage/processing facility.

With reference now to FIG. 8, a diagram depicts an airline luggage storage/processing facility in which an embodiment of the present invention may be employed to identify and locate suitcases or other types of luggage within the luggage storage/processing facility or to perform other types of transactions with respect to pieces of luggage within the luggage storage/processing facility. Many pieces of luggage can be stored within luggage storage/processing facility 800, which contains multiple RFID interrogation devices 802-806 throughout the facility. Each of luggage facility entrances 812-816 comprises one or more RFID interrogation stations, which act to isolate each entering or exiting piece of luggage so that an accurate interrogation can be made of the RFID tags that are located within on or in each piece of luggage, including RFID tags that may be affixed to items of clothing within the pieces of luggage. As suitcase 820 passes through interrogation station 816, an RFID interrogation operation is performed in accordance with the present invention, e.g., in a manner similar to that described above with respect to FIG. 2 or FIG. 4, to produce RFID signature 822 that becomes associated with suitcase 820.

Suitcase 820 may already have a temporary, airline-provided, flight-specific, luggage tag, which itself has an affixed RFID tag 824, which may be used for most temporary identification purposes for suitcase 820. However, there are many special purposes in which the use of the present invention is advantageous. For example, RFID signature 822 is used as a temporary identifier for suitcase 820 while suitcase 820 is within luggage facility 800, and RFID signature 822 provides support for location operations, particularly if luggage facility 800 processes lost luggage in which each piece of luggage must be individually moved. If suitcase 820 is desired to be located within luggage facility 800, RFID interrogation devices 802-806 may be employed to locate suitcase 820 in a manner similar to that described above with respect to FIG. 5.

As yet another example of an advantageous application of the present invention with respect to luggage, RFID signature 822 may be used to determine whether or not someone has tampered with suitcase 820. Assuming that identical RFID aggregation transform functions and identical RFID tag identifier filtering functions are consistently applied to suitcase 820, RFID signature value 822 should be generated at each RFID interrogation station through which suitcase 820 passes. If an RFID signature value is generated that differs from a previously generated RFID signature value for the same piece of luggage, i.e. within the same flight or trip, then the RFID interrogation station can flag the piece of luggage to indicate that someone may have tampered with it in some manner, e.g., to remove items of clothing or to add malicious items.

The advantages of the present invention should be apparent in view of the detailed description that is provided above. One or more RFID tags are already physically associated with a person or an object. The present invention leverages this scenario to aggregate RFID tag identifiers from those physically associated RFID tags and then to composite those RFID tag identifiers into an RFID signature that can be used for identification purposes, particularly for short-term or temporary identification purposes. In this manner, the RFID signature can be employed as an identification token, and the RFID signature may be used in a spatially search for a person or an object based on the previously generated and associated signature.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method in a data processing system for enabling temporary identification of a person using radio frequency (RF) identifier (ID) transponder tags (RFID tags), the method comprising:
   transmitting interrogation signals from an RFID reader device in a vicinity of the person;
   accumulating a set of pre-existing RFID tag identifiers of the RFID tags which are physically associated with the person from interrogation response signals, wherein each of the RFID tags returns a response signal that includes a pre-existing RFID tag identifier in the set of pre-existing RFID tag identifiers; and
   generating a temporary identification of the person using the set of pre-existing RFID tag identifiers;
   storing the temporary identification of the person for a temporary time-period to uniquely identify the person.

2. The method of claim 1, wherein generating the temporary identification further comprises:
   sorting each of the pre-existing RFID tag identifiers into a string of binary bits.

3. The method of claim 2 further comprising:
   compressing the string of binary bits by generating a hexadecimal digit character string.

4. The method of claim 2 further comprising:
   inputting the string of binary bits into a hash function.

5. The method of claim 1, wherein at least one of the RFID tags is affixed to an item of clothing worn by the person.

6. The method of claim 1, wherein the temporary identification is used to locate the person.

7. The method of claim 1 further comprising:
   comparing the temporary identification with a previously stored temporary identification to identify the person as a same person that previously entered the vicinity of the RFID reader device.

8. A data processing system for enabling temporary identification of a person using radio frequency (RF) identifier (ID) transponder tags (RFID tags), the data processing system comprising:
   transmitting means for transmitting interrogation signals from an RFID reader device in a vicinity of the person;
   accumulating means for accumulating a set of pre-existing RFID tag identifiers of the RFID tags which are physically associated with the person from interrogation response signals, wherein each of the RFID tags returns a response signal that includes a pre-existing RFID tag identifier in the set of pre-existing RFID tag identifiers;
   generating means for generating a temporary identification of the person using the set of pre-existing RFID tag identifiers; and
   storing means for storing the temporary identification of the person for a temporary time-period to uniquely identify the person.

9. The data processing system of claim 8, wherein generating means for generating the temporary identification further comprises:
   sorting means for sorting each of the pre-existing RFID tag identifiers into a string of binary bits.

10. The data processing system of claim 9 further comprising:
    compressing means for compressing the string of binary bits by generating a hexadecimal digit character string.

11. The data processing system of claim 9 further comprising:
    inputting means for inputting the string of binary bits into a hash function.

12. The data processing system of claim 8 wherein at least one of the RFID tags is affixed to an item of clothing worn by the person.

13. The data processing system of claim 8, wherein the temporary identification is used to locate the person.

14. The data processing system of claim 8 further comprising:
    comparing means for comparing the temporary identification with a previously stored temporary identification to identify the person as a same person that previously entered the vicinity of the RFID reader device.

15. A computer program product comprising a computer-readable medium having encoded thereon computer usable program code for use within a data processing system for enabling temporary identification of a person using radio frequency (RF) identifier (ID) transponder tags (RFID tags), the computer program product comprising:
    computer usable program code for transmitting interrogation signals from an RFID reader device in a vicinity of the person;
    computer usable program code for accumulating a set of pre-existing RFID tag identifiers of the RFID tags which are physically associated with the person from interrogation response signals, wherein each of the RFID tags returns a response signal that includes a pre-existing RFID tag identifier in the set of pre-existing RFID tag identifiers;
    computer usable program code for generating a temporary identification of the person using the set of pre-existing RFID tag identifiers; and
    computer usable program code for storing the temporary identification of the person for a temporary time-period to uniquely identify the person.

16. The computer program product of claim 15, wherein computer usable program code for generating the temporary identification further comprises:
    computer usable program code for sorting each of the pre-existing RFID tag identifiers into a string of binary bits.

17. The computer program product of claim 16 further comprising:
    computer usable program code for compressing the string of binary bits by generating a hexadecimal digit character string.

18. The computer program product of claim 16 further comprising:
    computer usable program code for inputting the string of binary bits into a hash function.

19. The computer program product of claim 15, wherein at least one of the RFID tags is affixed to an item of clothing worn by the person.

20. The computer program product of claim 15 further comprising:
    computer usable program code for comparing the temporary identification with a previously stored temporary identification to identify the person as a same person that previously entered the vicinity of the RFID reader device.

* * * * *